April 28, 1959  R. POESCHL  2,883,871
ENDLESS BELT HAVING CONNECTED END STRIPS IN A STEP ARRANGEMENT
Filed April 25, 1957
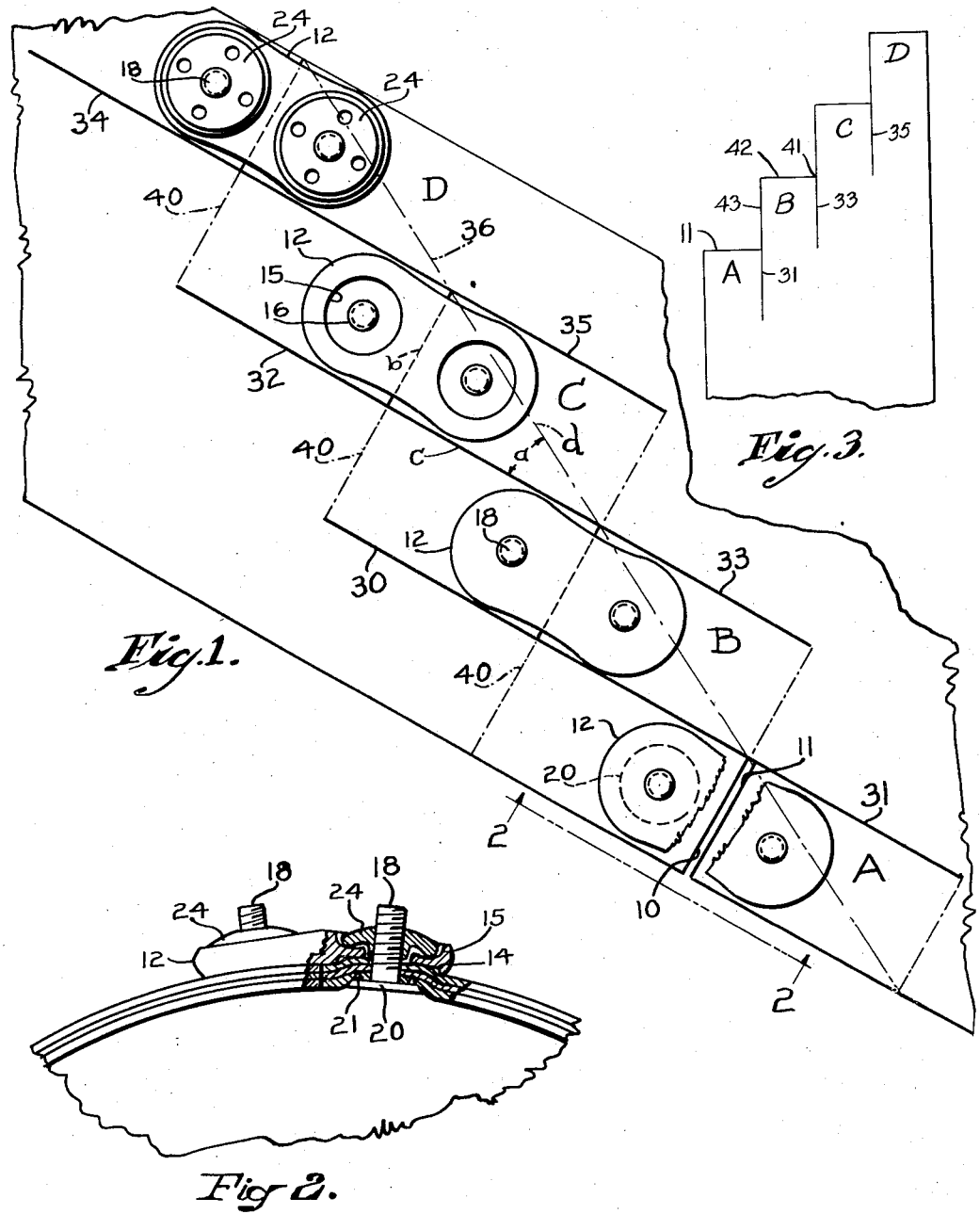
INVENTOR.
Rudolf Poeschl
BY
Clayton L. Jenks
ATTORNEY

United States Patent Office 2,883,871
Patented Apr. 28, 1959

2,883,871

ENDLESS BELT HAVING CONNECTED END STRIPS IN A STEP ARRANGEMENT

Rudolf Poeschl, Vienna, Austria, assignor to Hope Rubber Co., Inc., Fitchburg, Mass., a corporation of Massachusetts Application April 25, 1957, Serial No. 655,069

3 Claims. (Cl. 74—231)

This invention relates to an endless belt, and more particularly to a belt which has its ends connected by mechanical fasteners.

If a belt has its two ends cut perpendicular to a side edge, and these are fastened together by mechanical fasteners arranged transversely of the belt, there are various disadvantages inherent in such a construction. For example, if the fasteners are arranged in a straight line, they all strike the pulley at about the same time and cause a shock against the pulley bearing, as well as an attendant noise and vibration. Moreover, if the pulley is crowned, the belt does not hug the pulley properly where the belt ends are connected. The transmission of power is, therefore, uneven and there is a greater strain on the pulley bearings than would be had if the belt transmitted power uniformly and without that intermittency of action which is involved in the use of the transversely arranged fasteners. Also, if the belt is cut diagonally or obliquely and the ends are connected by a plurality of fasteners arranged in parallelism and perpendicular to the belt cut, then the transmission of power tends to swing the fasteners laterally and to draw the belt ends out of proper alignment.

The primary object of my invention is to overcome such disadvantages and to provide an endless belt which has juxtaposed ends connected by a plurality of fasteners so arranged in a step-like formation that they pass over the pulley in a sequence and do not transmit a shock to the bearing.

It is a further object of the invention to so shape the belt ends as to provide a series of separate strips which form a step-like arrangement for the fasteners, whereby each pulls directly longitudinally of the belt and independently of the others, and the power transmission across the fastened ends is adequate for the belt requirements and the fasteners will pass over a pulley, whether crowned or not, with adequate frictional grippage and transmit the power without material vibration or pounding against the bearings. Other objects will be apparent in the following disclosure.

Referring to the drawings:

Fig. 1 is a fragmentary plan view of the interconnected belt ends with the fasteners arranged in a step-like formation to connect a set of opposed belt strips, the top fastener being shown as complete, the next to the top fastener having the nuts removed and the others being diagrammatic, the lower fastener being broken away to show the belt ends;

Fig. 2 is a view taken on the line 2—2 of Fig. 1, but partly broken away to show the concave shape of the belt between the two fastener parts, which indicates how the belt strips are connected through a large area of frictional contact and the fastener can pass freely over a pulley; and Fig. 3 is a reduced size plan view of the right hand end of the belt.

In accordance with this invention, I mount a plurality of mechanical fasteners in a step-like arrangement at the two belt ends, and I slit each belt end to provide a comparatively long strip of material so arranged that the ends of each pair of aligned strips lie flat and with their under faces substantially in a plane and which are interconnected by a fastener which gives a direct pull thereon longitudinally of the belt.

The belt is illustrated in Fig. 2 as being laminated, but the invention will, of course, apply to a belt of a single layer. The belt has parallel traction and back faces and parallel sides or edges. As shown particularly in Fig. 1, each free end of the belt lies flat and is cut in a step-like formation and the steps of two belt ends have opposed edge faces 10 and 11 shaped in a reverse symmetrical arrangement so that the steps may be readily interfitted together. The steps have a width slightly greater than the width of the fasteners, so that there will be adequate freedom of motion of the belt parts, and the fastener size and the number of steps are selected according to the belt requirements.

The fastener may be of various mechanical types, but I prefer the construction shown particularly in Fig. 2. This comprises a plate 12 arranged flatwise on the top face of the belt end and which is slightly arcuate on its under side, the arc of which is related to the size of a pulley on which the belt is to be mounted, so that the belt beneath the fastener will be held by that arcuate shape against the curve of the pulley. The plate 12 is made of suitable metal and has a generally elliptical shape in its plan view. The plate has a circular recess 14 on its under side and another circular recess 15 on its top side. The plate has a hole 16 therethrough centrally of the two opposed recesses for the reception of the fastening bolt 18. Thus the two recesses 14 and 15 are annular. The lower recess may have a low circular rib immediately around the hole 16 which aids in gripping the belt material. The bolt 18 is provided with a comparatively largely circular or disk shaped head 20 which may have on its inner side a set of inwardly projecting pin points 21 which are adapted to press slightly into the belt material and aid in holding the parts together. The head 20 is somewhat smaller in diameter than the recess 14, and the thickness of the head 20 may be less than the depth of the recess, so that when the head has been drawn up against the under side of the belt, the latter will be forced upwardly into the concavity provided by the recess 14 and the outer face of the head 20 will lie substantially flush with the traction or pulley engaging belt face. A nut 24 is threaded onto the upper threaded end of the screw 18, and by means of a suitable wrench the nut is drawn into place to force the head 20 tightly against the belt. The nut 24 has a disc shape fitting within and located by the sides of the recess 15. It will be observed that this nut 24 and the projecting end of the screw 18 are on the outside of the belt and thus do not interfere in any way with the power transmission as the belt passes over the pulley.

The primary feature of this invention pertains to having each fastener in its step arrangement interconnecting the free ends of two juxtaposed and aligned belt strips that are substantially independent of the other strips of the belt except as each is a part of the free end thereof. Hence, each end of the belt is slit at 30 and 31 to form the lowermost strips of the two belt ends. Slits 32 and 33 are also provided to form the next pair of end to end strips immediately above the lowermost ones. The other strips of a four strip belt are made accordingly by the slits 34 and 35. As shown, the strips of the two belt ends are located in an edgewise or end to end abutting relationship with their under pulley engaging faces lying in a plane.

The fasteners and the strip ends are so located that a line 36 drawn through similar corners of the belt steps will subtend an angle $a$ with each of the parallel edges of the belt. That angle may vary from 10° to 70°, but it is preferred that the angle be acute and in the neighborhood of 30° to 45°. The angle which best suits my purposes is one in which the hypotenuse of a right angle triangle lies on the line 36 and considering the width of the belt strip as 1, then the length or base of that right angle triangle is 1.3. That is, the side $b$ of the right angle triangle $b$, $c$, $d$ near the center of Fig. 1 is the width of the step and may be considered as 1 and the base $c$ is preferably 1.3. The vertical side $b$ of the triangle defines the approximate positions of the juxtaposed ends of the two aligned strips of the opposite belt ends and therefore the center line 40 of the fastener.

A further preferred relationship is found in the length of the cuts which form the sides of the strips A, B, C and D of the right hand belt end, as well as the corresponding parts of the other belt end. The distance between the center lines 40 of the fasteners equals the triangle side $c$. The upper slits 31, 33 and 35 to the right of the center of each fastener has a length which is determined by the fastener position, whereby the length of the free portion of each inner strip is substantially equal to the length $c$ of each triangle $b$, $c$, $d$. The strip end B of Fig. 3, for example, is bounded by a short slit 33 at its upper side which extends inwardly from the inside corner 41 of the adjacent step 42, and at its lower side there is a free edge 43 forming what may be considered as the riser of the step. The lower slit 31 between the strip ends A and B is a continuation of the edge 43. Thus, the strip has a free lower edge which is about twice as long as its upper edge 33. This provides a full freedom of motion for the fastener that interconnects with the opposed strip of the other belt end. Each fastener thus connects two finger-like strips arranged in longitudinal alignment parallel to the center line of the belt, so that the pull transmitted on each fastener to its associated strip is directly longitudinal of the belt and not at all angular relative to the line of belt motion. As indicated by the dotted line 20 near the bottom of Fig. 1, the head of the bolt has a large surface contact with the leather belt and so provides sufficient frictional area to insure that the belt ends are held by friction rather than by a direct longitudinal pull of the bolt 18 against the holes that have been drilled through the belt to correspond with the location of the holes 16 in the fastener.

In view of the above disclosure, it will be appreciated that I have provided a belt for power transmission or other purposes, such as a conveyor belt which comprises a flat strip of a suitable flexible belt material having two juxtaposed abutting ends which have been cut in a step-like shape. The two opposite stepped ends of the belt are shaped in a reverse symmetrical arrangement so that the parts interfit together lengthwise of the belt with their ends in an edgewise abutting relationship. The strip ends 10 and 11 are shown at the lower right hand portion of Fig. 1 as slightly separated, as would be a normal abutting arrangement. The fasteners are selected in size, strength and number to fit the belt requirements. The width of the fastener determines the width of each free strip of the belt end, as is indicated in Fig. 1, so that the width of the fastener may be considered as substantially equal to 1 in the ratio of 1:3.3, as above discussed. The fasteners are of the mechanical type, in which the belt is clamped between opposed clamp plates which comprise the head 20 of the bolt and the concaved recess 14 of the fastener body 12. The clamp faces are substantially parallel with the pulley engaging face of the belt. By drawing the belt tightly into this concaved recess, I have thereby provided a very large frictional resistance between the parts so that very little stress is applied to that portion of the belt which is immediately in front of the fastening bolt 18. This is indicated by the large size of the dotted line 20 at the bottom portion of Fig. 1, representing the size of the bolt head.

To form the strips which receive the longitudinal pull of the power transmission, I slit the belt in parallel spaced cuts in such a manner that each fastener connects with a free belt strip and the power transmission is solely lengthwise of that strip parallel with the direction of belt movement and not at all laterally. As shown in Fig. 1, the free portion of the strip is about as long as the fastener itself and the latter is therefore comparatively remote at its right hand end, for example, from the inner end of the free portion of the strap. This same condition applies to the opposed strip of the other belt end. Hence, the strip is detachably free from the laterally adjacent strip in the general location of the application of the fastener.

It will also be noted by reference to Fig. 1 that the angle $a$ between the line 36 and one of the slits 32 which is parallel with a longitudinal edge of the belt is such that the fasteners are not laterally opposite each other, although wide latitude is provided in this manner. I prefer the angular arrangement as above discussed in which the hypotenuse $d$, lying on line 36, of a right angled triangle makes an acute angle with the base line $c$ of that triangle and preferably within the range of 30 to 45° or more. It will be observed that that hypotenuse $d$ extends from the center line 40 of one belt fastener to the center line 40 of the next fastener in the series so that the angle $a$ is dependent on the size of the fastener as well as the space between two adjacent fasteners. It is preferred that the base $c$ of that right angled triangle be 1.3 times the width of the strip which is in turn determined largely by the width of the fastener. If a larger angle $a$ is employed, then of course the fasteners are moved more toward a laterally spaced arrangement.

The operation of the construction has been made fully apparent in the above discussion of the invention, and it will be appreciated that various modifications may be made in the construction and arrangement of the parts within the scope of this invention.

I claim:

1. An endless belt comprising a flat strip of flexible belt material having parallel traction and back faces and parallel sides and two opposed step-shaped ends in an edgewise, substantially abutting and reversed arrangement, each of said belt ends having steps and spaced, longitudinal slits extending rearwardly from the bottoms of the steps and in parallel planes between the belt sides which form laterally separated, independently movable belt strips extending forwardly of the non-slitted portion of the belt with their faces in the planes of the faces of the non-slitted belt portion, and a set of mechanical belt fasteners removably connecting the longitudinally juxtaposed ends of the laterally free strips of the two belt ends, each fastener comprising two sets of clamps engaging the opposite faces of two opposed strips, and the strips and fasteners being so arranged that each pair of connected strips is laterally free and the stress transmitted by the fastener is wholly longitudinal of the connected juxtaposed strips.

2. A belt according to claim 1, in which said clamps have extensive clamp faces and wherein the width of each strip is gauged by the clamp size to be sufficiently wider than the clamp to provide an adequate belt clamping surface and insure freedom of motion of the fastener, the angle of a line connecting similar belt step corners relative to a side edge of the belt being within the range of 10 to 70 degrees.

3. A belt according to claim 2 in which the angle is substantially that angle in a right angle triangle which lies between the hypotenuse lying in said line connecting the step corners and a base line formed by the strip side edge, the other side of the triangle being the width of the strip and said baseline having a value of about 1.3 times the strip width.

References Cited in the file of this patent

UNITED STATES PATENTS 1,735,686    Kimmich  ---------------- Nov. 12, 1929

FOREIGN PATENTS 113,289    Germany  ---------------- Sept. 12, 1900